Patented May 8, 1945

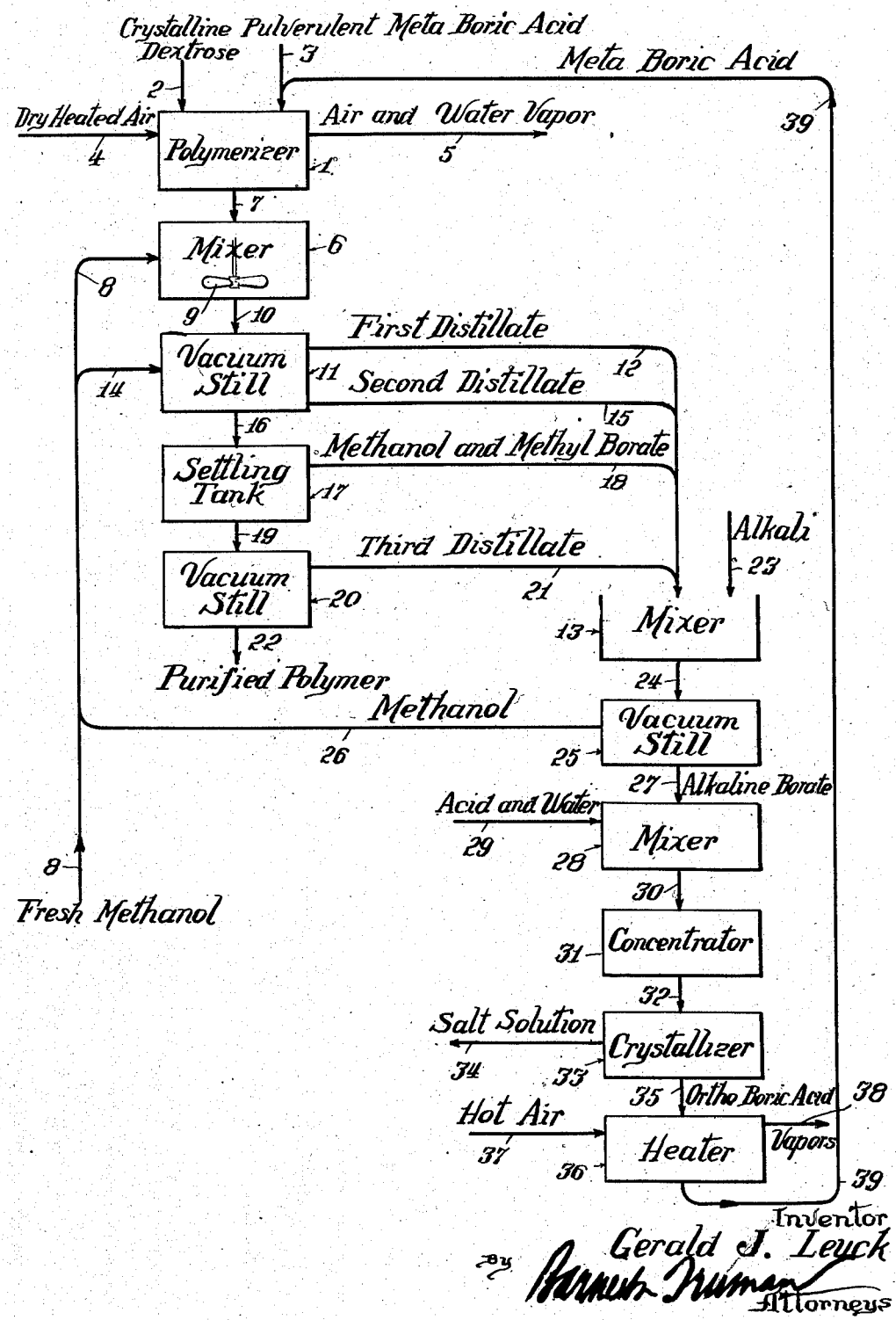

2,375,564

UNITED STATES PATENT OFFICE 2,375,564

POLYMERIZATION OF DEXTROSE

Gerald J. Leuck, Evanston, Ill., assignor to Corn Products Refining Company, New York, N. Y., a corporation of New Jersey Application February 9, 1942, Serial No. 430,162

27 Claims. (Cl. 260—209)

This invention relates, primarily, to the polymerization of dextrose; and the principal object of the invention is to provide an efficient and relatively inexpensive process for the production of a polymerized dextrose product which will contain a large quantity of dextrose polymers, in proportion to the amount of dextrose treated, and in which the dextrose polymers will contain a large average number of dextrose units; that is to say, a product in which the amount and also the degree of polymerization are high.

The term "dextrose units" as used herein means, actually, units of carbohydrate material having the generic formula $C_6H_{10}O_5$ and having the special configuration of d-glucose, including dextrose anhydrides, such as glucosans. It will be realized, however, that there are many other $C_6H_{10}O_5$ compounds of varying configuration, all of which fall within the generic dextrose anhydride group. That is, the polymerization of dextrose involves the elimination of one molecule of water from the anhydrous dextrose treated, as well as the building up of the dextrose anhydride units into polymers of varying degrees of polymerization. It should be observed, however, that during the polymerizing operation the dextrose anhydride unit may undergo various transformations into $C_6H_{10}O_5$ configurations; and the term "dextrose polymers" as used herein, is intended to cover all such configurations. It should also be remarked that the polymers produced in accordance with this invention need not consist of single $C_6H_{10}O_5$ molecules. They may consist of two or more such molecules combined as glycosides. By "dextrose polymers" is intended the product, whatever its chemical nature, which results from the polymerizing operation, including essential changes and other chemical reactions that may take place incidentally to the polymerizing operation including the alteration of the dextrose anhydride configuration.

Another and very important object of the invention is to provide a polymerization process in which the formation of color will be reduced to a minimum.

The dextrose used for the production of the polymerized product may be alpha anhydrous dextrose in a crystal state. Commercial alpha anhydrous dextrose, which is a high purity product, is suitable for the purpose. The dextrose should be in the form, preferably, of fairly large sized crystals, such as those of the usual commercial product averaging from 20 to 100 mesh per linear inch. It should not be pulverized.

It is also possible to use beta anhydrous dextrose; but the process is not efficient unless the beta anhydrous dextrose is in a relatively pure state. Most of the beta anhydrous dextrose of commerce contains a large proportion of alpha anhydrous dextrose, and this mixture is not suitable for polymerization according to the present process, although it may be used and a product polymerized to some extent produced thereby.

It is also possible to use hydrate dextrose, in a crystalline state, and obtain satisfactory results provided suitable operating methods are employed, as hereinafter described.

It is also possible to use dehydrated dextrose crystals but the results appear to be less satisfactory with respect to amount and degree of polymerization and color.

The process does not appear to be applicable, according to present experience, to sucrose or xylose; but can be used effectively for the polymerization of maltose, a disaccharide composed of two dextrose units. It is believed, for reasons to be stated, that the process can, in fact, be used for the polymerization of any reducing or dextrose polysaccharide, that is any sugar which is composed of dextrose units.

A strikingly characteristic feature of applicant's process is that the sugar (which will be referred to hereinafter as dextrose with the understanding that the process is also applicable to maltose and other dextrose polysaccharides) is polymerized without destroying or impairing the individuality of the dextrose crystals as to form. The crystals are not reduced to a molten state, although they may possibly undergo a slight, incipient melting or softening superficially. By referring to the sugar as not being reduced, in or prior to the polymerizing operation, to a molten state, it is not intended to negative the possibility of the crystals being superficially melted as just stated. The term "molten state" as used herein implies melting to the extent that crystal structure is substantially obliterated. The product, therefore—the polymerized dextrose—may be appropriately referred to as a product of "crystal-like" character, although the transformed dextrose crystals may not be crystals, in the strict crystallographic sense, and undoubtedly are not crystals of the product or products resulting from the polymerizing action. No claim is made herein to the process of polymerizing dextrose, or other sugars, by melting the sugar and treating it with catalysts while in a molten state. A process of such character is claimed in applicant's copending application, Serial No. 437,273, filed April 1, 1942.

Another characteristic feature of the present invention is the use, as catalysts, or as primary catalysts, of boron compounds, for example, boric anhydride, and tetra, meta and ortho boric acids. Theoretically, because the process is intended to be carried on so far as possible under anhydrous conditions, boric anhydride is to be preferred rather than the other above mentioned boron compounds. But for practical and economic reasons, meta boric acid, containing only one molecule of water per molecule of boric anhydride, should be used, since, on the one hand, boric anhydride and tetra boric acid are difficult to obtain in suitable physical form and, on the other hand, ortho boric acid contains too large a quantity of molecular water to make it desirable to use.

While a boron compound (which hereafter for convenience will be referred to as boric acid) appears to be essential, as a catalyst (at least for the polymerization of dextrose)—so that, because the process involves using this substance in relatively large quantities, it may be regarded as the primary catalyst in the dextrose polymerization reaction—by far the best results are obtained when a small amount (which in some cases may be a mere trace) of a secondary or co-catalyst is employed with boric acid. The secondary catalyst may be an acid, an acid salt or a neutral salt. Alkaline salts are excluded because of their destructive effect on the dextrose. The secondary catalyst may be present as an impurity in either the dextrose or in the primary catalyst; or it may be present in the atmosphere, particularly acidic material such as sulphur dioxide or hydrogen chloride; and in the specific examples which follow the polymerizing operations were carried out, unless otherwise specified, in the presence of traces of the secondary catalysts in the materials treated and in the atmosphere.

It has been further discovered by applicant that these secondary catalysts, if used in appreciable quantities, lower the polymerizing temperature of the dextrose, so that the process may be carried out efficiently at relatively low temperatures. This is desirable in order to minimize color formation which is a function of temperature. Any acid or other acidic material or neutral salt, suitable for use as a co-catalyst with the boric acid, will reduce the polymerizing temperature.

The polymerization is brought about ordinarily by heating the dextrose at a temperature below the melting point of the dextrose, viz. 146° C. (295° F.). However, with large quantities of boric acid in a finely divided state, it is possible to operate somewhat above the melting point of the dextrose for reasons to be stated.

It has also been found that the amount and degree of polymerization can be increased, without bringing about melting of the material, if, after the dextrose has been subjected in the presence of the catalyst, to a temperature below or near its melting point, but at or above a temperature which will bring about incipient polymerization, it is then subjected for a time to a temperature very considerably above its melting point. In fact, this effect may be obtained even if the first heat treatment, because of the low temperature employed, brings about little or no polymerization according to the analytical methods used for determining amount and degree of polymerization.

All of these procedures aim at obtaining polymerized products which will be as nearly white as possible, that is, which, as to color, will resemble as nearly as possible the crystalline dextrose treated; which will contain as large a quantity of polymers as possible, in proportion to the amount of the sugar treated; and in which the sugar will be polymerized to the highest degree possible, that is, will contain, on the average, as large a number of dextrose units as possible.

However, it is realized that for certain purposes all of these characteristics may not be essential. For example, polymerized dextrose product having a low polymer content and a relatively low degree of polymerization may be useful for certain purposes. In all cases coloration is to be avoided as far as possible.

The product may be used advantageously as a humectant, for example, as a substitute for glycerin in the treatment of tobacco. The invention is in no way limited to this particular use. The dextrose polymers of this invention are characterized by low reducing values in comparison with other reducing polysaccharides such as the disaccharide maltose or the trisaccharide raffinose. For example low degree polymers of this invention which average two or three dextrose units appear to have reducing values considerably less than maltose and raffinose respectively.

The products of this invention are heterogeneous mixtures of polymers having a wide variation in degree of polymerization.

While the dextrose polymer-boric acid mixture resulting from the polymerization process may have utility for certain purposes, it has been realized that, generally speaking, it will be necessary to remove the catalyst from the dextrose polymer product; and one of the objects of the invention has been to provide a process for effecting such removal of the catalyst—the boric acid—and the recovery of the same for re-use, as well as the recovery for re-use of the agent (methanol) used for effecting the separation of the boric acid from the dextrose polymer product.

The removal and recovery process is illustrated in the accompanying flow sheet drawing.

The processes outlined above are exemplified in the following specific examples of the reduction to practice of the invention. It will be understood, however, that these examples are purely illustrative and typical. The invention is not to be regarded as limited to the particular operating data given therein.

Before description of the specific examples, it will be necessary to describe the analytical method used for determining the amounts and degrees of polymerization referred to, for purposes of comparison, in the specific examples. It will be understood that the polymerized product is subjected to analysis, in all cases, after the boric acid has been removed from the product.

METHOD OF DETERMINING AMOUNT AND DEGREE OF POLYMERIZATION

A 13.3% solution is made by adding distilled water to the dextrose polymer. 15 cc. of this water polymer solution, in which the dry substance is equivalent to 2 grams of the original dextrose, is used for making the tests. To this 15 cc. polymer solution there is added, in three stages, anhydrous isopropyl alcohol, and the precipitates are removed after each addition of the alcohol. At the first stage 20 cc. of alcohol is added to the 15 cc. polymer water solution. At the second stage 15 cc. of alcohol is added so that the alcohol content of the solution at this stage is 35 cc. At the third stage 50 cc. of alcohol is added so that the alcohol content of the solution is 85 cc. The precipitated substances, at all stages, are dextrose polymers but of different degrees, on the average, of polymerization. The isopropyl alcohol test is based on the fact that pure dextrose itself is completely soluble in aqueous isopropyl alcohol as well as in water, whereas dextrose polymers, which are soluble in water, are insoluble in aqueous isopropyl alcohol and this insolubility depends (1) upon the alcohol content of the solution, the more concentrated the solution the greater the insolubility of the dextrose polymer; and (2) upon the degree of polymerization of the dextrose polymer, namely, the higher the degree of polymerization, that is, the greater the number of dextrose units in the dextrose polymer, the greater the insolubility of the polymer in a water-isopropyl alcohol solution of a given alcohol concentration. If no precipitate is obtained in the 85 cc. aqueous isopropyl alcohol solution the assumption is that no polymerization has taken place and the dextrose is still all there in its original form; or possibly, that the material consists mostly of dextrose but with a small amount of dextrose polymer; or, it may be, that the material consists entirely of polymer products but of a low degree of polymerization. In any case, there is no substantial formation of polymers in the sense of the present invention which aims at substantial amounts and degrees of polymerization.

If the polymerization has taken place to the extent that precipitates occur in all three alcoholic portions, then the greater the per cent of dextrose polymer precipitated in the 20 cc. isopropyl alcohol portion, the greater the degree of polymerization of the precipitated dextrose polymer.

When the 15 cc. polymer solution is treated with isopropyl alcohol, the polymer is precipitated in the form of an emulsion or very fine dispersion which ordinarily cannot be filtered but is best centrifuged. Each centrifuging operation gives a light upper layer of isopropyl alcohol containing dextrose and such dextrose polymer as does not precipitate at the particular alcohol concentration, and a heavy lower layer of the precipitated dextrose polymer. The heavy or lower layer is evaporated to constant weight and the ratio of this to the total dry substance weight of the specimen treated represents the percent precipitated at this particular stage.

The degree of polymerization, at each stage, is made by a recognized molecular weight determination such as by determining the extent to which the freezing point of a 10% or 20% aqueous solution of these polymers is lowered. By ascertaining the molecular weight of the polymer one can compute the number of dextrose units in the polymer since it is known that a dextrose polymer consists of dextrose units wherein two or more dextrose molecules have condensed with each other with an accompanying loss in each case of one molecule of water. Since the molecular weight of dextrose is 180 and the molecular weight of water is 18, the dextrose unit in the dextrose polymer has a molecular weight of 162. From this it follows that by first subtracting 180 from the total molecular weight of a polymer and then dividing the difference by 162, the number of dextrose units will equal 1 plus the quotient.

EXAMPLE No. 1.—*Boric acid as a polymerization catalyst*

Alpha anhydrous dextrose in a crystalline state is dried at 80° C. (176° F.) for twelve hours in order to remove any water, free or molecular, that the material may contain. This example assumes the use of commercial crystalline alpha anhydrous dextrose, which will ordinarily contain a small fraction (about 0.25%) of water present probably through surface adsorption. The removal of this water, if not essential, is preferable. There is added to and blended with the dextrose 5%, by weight, of finely powdered meta boric acid. The meta boric acid is also, preferably, pre-dried and should be powdered fine enough to pass through a 170 mesh screen (170 meshes to the linear inch) or, which is preferable, so as to pass through a 200 mesh screen. In fact, the finer the boric acid is powdered, the better are the results obtained. This blended mixture is then spread out in a thin layer and heated to a temperature of 135° C. (275° F.) at which temperature it is maintained for 5 hours. The product is a granular material of crystal-like character, as that term is defined above, in which the individuality of the original dextrose crystals as to their form has not been lost. That is, the process of polymerization has transformed the dextrose crystals, separately and individually, into granular particles, containing or consisting of dextrose polymers, without substantially affecting the contour and shape of original dextrose crystals. The product in color is only slightly darker than the original dextrose crystals.

In this example, other conditions being as stated, a possible range of temperatures will be between about 133° C. (271° F.) and 145° C. (293° F.); and the lower the temperature within this range, the greater the amount and degree of polymerization.

The isopropyl alcohol analysis of the product in accordance with the method specified above is as follows:

*Table 1*

| Isopropyl alcohol added to 15 cc. polymer solution to give alcohol contents of— | Percent dextrose polymer precipitated on total dry substance in sample | Degree of polymerization indicated by number of dextrose units |
|---|---|---|
| 20 cc | 35 | 8.5 |
| 35 cc | 26 | 6.4 |
| 85 cc | 12 | 5.8 |
| Total | 73 | |

The figures under "degree of polymerization, etc." represent a mathematical average which may cover a wide range of molecular weights. Qualitative tests have indicated that small fractions of the portion of polymerized product precipitated with the first addition of 20 cc. isopropyl alcohol represent dextrose polymers containing as high as forty to fifty dextrose units. This, in turn, would imply the presence in the sample of polymers having molecular weights ranging between 6480 and 8100. Since the molecular weights of high soluble dextrines range between about 10,000 and 20,000, it can be said that the dextrose polymers formed in accordance with this invention begin to approach the degree of polymerization of modified starch products.

POLYMERIZATION THEORIES

Several theories may be advanced to explain why it is possible to polymerize dextrose crystals without reducing the dextrose to a molten state; that is, while maintaining the individuality and integrity as to form of the dextrose crystals.

One theory is that the space lattice arrangement of crystalline dextrose is of such a nature as to give the boric acid an opportunity of reacting with some of the hydroxyl (OH) groups of the dextrose molecules. This results in the formation of what may be considered as a dextrose borate complex. This dextrose-boric acid complex is an unstable compound which exists only temporarily and is followed by the liberation of the boric acid with the resultant formation of a dextrose polymer through the condensation of two dextrose molecules accompanied by the loss of one molecule of water.

In the case of other sugar crystals which are apparently not polymerized in accordance with the present invention by boric acid, for example, sucrose and xylose, the space lattice structure is such that the boric acid does not have the opportunity to react with hydroxyl groups, in a manner similar to that taking place with dextrose. From the above theory it may be assumed, that any crystalline sugar which has a space lattice wherein hydroxyl groups are capable of reaction with boric acid in a manner similar to that of boric acid and crystalline dextrose should be capable of forming sugar polymers in the presence of boric acid catalysts without destroying the crystal-like form of the sugar. The theory is consistent with applicant's discovery that the process described for dextrose will work in the case of maltose which consists of two dextrose units.

Another theory is that as the dextrose crystals are heated, they are softened or melted slightly at their outer surfaces but not enough to affect substantially the shape of the crystals. These melted or softened surfaces are coated with the fine boric acid powder particles. The boric acid dissolves into and then polymerizes this surface dextrose as fast as the melting occurs. The dextrose polymer being infusible forms a protective coating which prevents the crystal from melting, except initially and superficially, and thereby preserves the form of the original crystal. The boric acid, on the other hand, continues to diffuse into the crystal interior, because of the softened condition. The boric acid powder also serves as a surface-active agent which keeps the individual dextrose crystals from fusing together during the initial superficial melting. The statement in the claims that crystals are not reduced to a molten state is not intended to exclude a superficial melting or softening of the crystals.

It is quite possible that both of these theories are correct.

Under the conditions of Example No. 1 the range of polymerizing temperatures has to be narrow, if the process is to be efficient. The range is approximately between 133° C. (271° F.) and 145° C. (293° F.). Below 133° C. the dextrose does not polymerize to any substantial extent. Above 145° C. the dextrose will melt before becoming polymerized. However, as will be shown in examples which follow, after partial polymerization, or even after heat treatment below the normal polymerizing temperature, the material may be heated at temperatures very much above the melting point of dextrose, without melting the crystals, with an increase of the amount and degree of polymerization and without undesirable color formation.

The heating (referring to the Example No. 1 and those to be described hereinafter) may be done in an oven with the material spread out in trays or in a rotary drum heater or in any other way whereby there will be a uniform distribution of the heat.

As the polymerization of the dextrose involves the splitting off of water from the dextrose (the opposite of the hydrolysis which occurs when a dextrose polymer, e. g., starch, is converted to dextrose) the heating apparatus should be operated, e. g., by circulation of dried and heated air, so as to effect the vaporization and discharge of water as it is formed.

BORIC ACID

There is a wide range in respect to the quantity of boric acid used. Practically it is possible to use from a trace to 35% or more by weight. The amount of boric acid can be considered, however, only in connection with its degree of pulverization. The only boric acid which produces polymerization is that which is at the points of contact with crystal surfaces of the dextrose. The smaller the particle size of the boric acid, the greater will be the amount of boric acid, in the total amount actually used, which will be in contact with the dextrose crystal surfaces and therefore effective to produce polymerization. One might, for example, use 35% of boric acid of 20 mesh pulverization and obtain less polymerization than with 1% of 200 mesh boric acid. The boric acid may be ground mechanically and blended with the crystalline dextrose by means of a suitable mixing apparatus. Or the dextrose crystals may be suspended in a liquid solvent of boric acid such as acetone, in which dextrose is insoluble, and the solution-suspension evaporated to coat the dextrose crystals with boric acid particles.

As to the type of boron compounds, boric anhydride ($B_2O_3$) contains, as the name implies, no molecular water. Tetra boric acid ($H_2B_4O_7$) contains one-half molecule of water. Meta boric acid ($HBO_2$) contains one molecule of water. Ortho boric acid ($H_3BO_3$) contains three molecules of water. Theoretically, boric anhydride should be the best catalyst; and this is the fact; but this product is difficult to obtain or manufacture. It is preferable not to use ortho boric acid because of its large content of molecular water. Practically meta boric acid which contains only one molecule of water is the most convenient of the boron compounds. It can be readily produced from ortho boric acid (the usual commercial boric acid) by extracting some of the molecular water contained in the latter. In place of the boron compounds above referred to one may use any non-alkaline material containing $B_2O_3$.

The amount and fineness of the boric acid used has a bearing upon color formation as well as amount and degree of polymerization. The reason why a much lighter color product is obtainable with boric acid, used in accordance with the present invention, in comparison with other catalysts used in the production of dextrose polymers from molten dextrose, is because with boric acid acting directly on the dextrose crystals, the rate of polymer formation is so rapid that the dextrose does not have time to melt and darken in color. The more thoroughly the fine boric acid particles coat the dextrose crystals, the more efficient will be the rate of polymerization and the less color formation will result. To summarize: color formation is inhibited by (1) fineness of the boric acid powder, the finer the powder the less color; (2) by the amount of boric acid, namely the more boric acid of a given fineness, the less color; (3) by a temperature which is below the melting point of the dextrose, in the presence of the catalyst, at least until the polymerization has been initiated; (4) by a relatively short time treatment; and (5) by the absence of water or at least its removal as soon as formed.

Experience has demonstrated that if undried air is circulated through the heating apparatus the polymerizing operation is likely to be detrimentally affected. Generally speaking the lower the atmospheric humidity the better the result. Where there is a substantial amount of moisture in the atmosphere the product is likely to be discolored and contain a substantial, if minor, portion of non-granular, lumpy, fused, poorly polymerized substances which are difficult to separate, adequately, from the rest of the product either by sifting or by extraction with solvents.

REMOVAL OF CATALYST FROM THE DEXTROSE POLYMER AND RECOVERY OF BORIC ACID AND METHANOL

Referring to the annexed flow sheet, 1 designates the heating apparatus or polymerizer into which dried crystalline anhydrous dextrose is introduced at 2 and powdered meta boric acid, also preferably pre-dried, is introduced at 3. Dried air is introduced into the polymerizer at 4 and air and water vapor discharged therefrom at 5. The dextrose and boric acid may be blended either in the polymerizer or before being delivered thereto. The polymer-boric acid mixture is introduced from the polymerizer into vessel 6, as indicated at 7, and an excess of anhydrous methanol introduced into vessel 6 at 8. Preferably, 25 parts of polymer material is suspended in 125 parts of methanol with mixing produced by the agitator 9 to prevent lump formation which might be caused by the tendency of the polymer particles to adhere to each other. The mixture is then sent through conduit 10 to a vacuum still 11. Distillation of methanol, and of the methyl borate resulting from the reaction between the methanol and boric acid, is carried on at a temperature between 10° and 15° C. (50° and 59° F.), the distillates going through conduit 12 to tank 13. This continues until 50 parts of the methanol has been distilled off, whereupon 50 parts of fresh methanol is introduced into the vacuum still 11 through conduit 8—14. The vacuum distillation is then continued at the same temperature until 50 parts more of the liquid have been distilled off and delivered through conduit 15—12 to the tank 13. The material in the vacuum still 11 is then delivered at 16 to a settling tank 17, from which the major portion of the liquor is decanted through conduit 18—12 into the vessel 13, leaving about 15 parts of the liquid mixed with the polymer material. This material is discharged at 19 into a second vacuum still 20 in which the fifteen parts of liquid mixed with the polymer material is distilled off and delivered to vessel 13 through conduit 21—12. The purified polymer material is discharged from the vacuum pan at 22.

This polymer material may contain 0.25 per cent or less of ortho boric acid; and its appearance is practically identical with the appearance of the original polymer when viewed through the microscope.

The boiling point of methyl borate is 65° C. (149° F.), the boiling point of methyl alcohol is 66.8° C. (152° F.). In view of the closeness of the boiling points of these two liquids it is not practical to separate them by fractional distillation. Consequently, the distillates and decanted liquids are introduced together into the vessel 13, as above described, into which is introduced at 23 an alkaline substance in quantity sufficient to neutralize the boric acid. Any suitable neutralizing agent may be used, such as caustic soda, caustic potash or lime. The caustic soda or caustic potash, for example, neutralizes the boric acid to the corresponding salt, namely sodium borate or potassium borate, both of which are soluble in methyl alcohol. The neutralized liquid in vessel 13 is then introduced at 24 into a vacuum still 25, from which the methanol is distilled, passing through pipe 26 to the methanol supply line 8, leaving in the vacuum still 25 a powdered residue of alkali borate. The latter is discharged at 27 into a vessel 28 into which is introduced at 29 a mineral acid and water. Suitable mineral acids are hydrochloric acid and sulfuric acid. The resulting solution consists of boric acid and the corresponding salt, namely, sodium or potassium chloride or sodium or potassium sulfate. This solution is introduced at 30 into a concentrating device 31 and the concentrated liquid goes by pipe 32 into a crystallizer 33 where the boric acid crystallizes as ortho boric acid. The remaining salt solution is discharged from the process at 34. The ortho boric acid is introduced at 35 into a heater 36 into which hot air is introduced at 37 and from which two molecules of molecular water are drawn off at 38, converting the material into meta boric acid, which is conveyed, as indicated at 39, to the meta boric acid supply 3 going to the polymerizer 1.

One of the principal problems involved in any system for removing the catalyst and recovering catalyst and removing agent is to prevent the coalescence and adherence one to another of the polymer particles. This result can be obtained: (1) By excluding water from the process as much as possible. (2) By removing the methanol from the polymer as quickly as possible. (3) By using a distillation temperature well below room temperature, for example, 10° to 15° C. (50° to 59° F.). The minimum temperature is the lowest at which the methyl borate and methyl alcohol will distill off. Between this lower limit and the maximum of 15° C. the lower the temperature the better the results in respect to non-adherence of the polymer particles. (4) By using a large excess of methanol to prevent, as much as possible, contact between the polymer particles. (5) By the expedient of distilling the methanol and methyl borate and replacing the methanol thus removed with fresh methanol. (6) By using a large excess of methanol for the purpose of taking up the molecular water released when boric acid reacts with methonal to form methyl borate.

EXAMPLE No. 2.—*Two-stage polymerization below and above melting point of dextrose*

A unique feature of the use of boric acid as a catalyst is that dextrose can be polymerized by heating to temperatures below the melting point of dextrose 146° C. (295° F.). Another striking characteristic of this reaction is that if polymerization is started below the melting point of dextrose, the temperature may be raised to a point considerably above the melting point of dextrose and an increased yield of polymers obtained without melting of the material or correspondingly increased coloration. Between 133° and 145° C. (271° and 293° F.) the polymerization reaction is active. Experiments indicate that if the temperature is then raised slightly above the melting point of dextrose, no melting takes place but, at these low temperatures, there is no substantial increase in the amount or degree of polymerization. It is necessary to raise the temperature 25° to 30° C., that is, to a temperature of about 175° C. (347° F.) before the polymerization is substantially increased.

The failure of the polymer particles to melt at this high temperature is probably due to the fact that the polymerizing action is initially a surface reaction and the capacity of the dextrose crystals to melt disappears as soon as all of the crystal surfaces have been surrounded with thin shells or films of infusible dextrose polymer.

According to the present example alpha anhydrous dextrose is blended with 5% of meta boric acid after both substances have been preliminarily dried, the meta boric acid being pulverized to 200 mesh, and the mixture heated first for 5 hours at 135° C. (275° F.) and then for 1 hour at 175° C. (347° F.).

The isopropyl alcohol test gives figures as indicated in the following table:

*Table 2*

| Isopropyl alcohol added to 15 cc. polymer solution to give alcohol contents of— | Percent dextrose polymer precipitated on total dry substance in sample | Degree of polymerization indicated by number of dextrose units |
|---|---|---|
| 20 cc | 64 | 9.4 |
| 35 cc | 14 | 6.9 |
| 85 cc | 8 | 6.5 |
| Total | 86 | |

Comparing these results with those obtained under Example No. 1, it is obvious that both the amount and the degree of polymerization have been increased. The degree of polymerization, in particular, has been increased to a considerable extent as indicated by the fact that the percent precipitated with the addition of 20 cc. of isopropyl alcohol has increased from 35% to 64%. This is more significant than the difference under the caption of "Degree of polymerization"; since, as stated above, the latter figures represent averages of wide ranges of molecular weights.

It is important to note that in spite of the comparatively high temperature treatment, the resulting product is very light in color, being only slightly darker than the original dextrose.

Example No. 3.—*Two-stage boric acid polymerization second stage for longer period*

The operating data of this example may be the same as the operating data of Example No. 2 except that the polymerization at the second stage, that is, at 175° C. (347° F.) is continued for 5 hours.

The results given by the isopropyl alcohol test are as follows:

*Table 3*

| Isopropyl alcohol added to 15 cc. polymer solution to give alcohol contents of— | Percent dextrose polymer precipitated on total dry substance in sample | Degree of polymerization indicated by number of dextrose units |
|---|---|---|
| 20 cc | 68 | 9.6 |
| 35 cc | 11 | 7.0 |
| 85 cc | 8 | 6.7 |
| Total | 87 | |

Amount of polymerization and degree of polymerization are both increased, over Example No. 2, but not in proportion to the longer treatment at the higher temperature.

Under the conditions of Example No. 3 it is necessary to use in the first operation, a temperature to initiate polymerization, within the range of 133° to 145° C. (271° and 293° F.). Where the dextrose-meta boric acid mixture is first treated for 5 hours at 125° C. (257° F.) and then for an hour at a lower temperature, e. g., 175° C. (347° F.), the dextrose is melted, and gives a dark, black resinous product and if the dextrose be heated initially to 175° C., the same result, naturally, will follow.

However, there is a relationship between temperature, in the first or polymerizing operation, and the amount and fineness of the catalyst. If a large amount of very finely powdered meta boric acid be used, instead of the 5% contemplated by Example No. 3, it will be possible to carry on the first operation at a temperature somewhat above the melting point of the dextrose and still obtain polymerization without appreciable melting. It will be understood that in all of the specific examples, herein, the effort has been to express conditions which will give the best results in respect to amount of polymerization, degree of polymerization and the minimization of color production. Operations outside of the limits given may be possible with the sacrifice of some or all of these desirable characteristics in the product.

Example No. 4.—*Initial temperature above the melting point of dextrose*

Example No. 4 illustrates the principle that increase of the amount and/or fineness of pulverization of the catalyst may permit heating, initially, above the normal melting point of the dextrose. Alpha anhydrous dextrose, preliminarily dried, is mixed with 35%, by weight, of meta boric acid pulverized to 170 to 200 mesh. The blend is heated for 5 hours at 150° C. subsequent to one hour of gradual heat elevation to reach this temperature. The product is white in color and appears, when viewed under the microscope, to have retained the original alpha anhydrous dextrose crystal form despite the high polymerizing temperature. The amount and degree of polymerization—the latter approximately—are shown by the following table which is based upon the previously described isopropyl alcohol test:

*Table 4*

| Isopropyl alcohol added to 15 cc. polymer solution to give alcohol contents of— | Percent dextrose polymer precipitated on total dry substance in sample |
|---|---|
| 20 cc | 50 |
| 35 cc | 26 |
| 85 cc | 9 |
| Total | 85 |

It may be noted that if the same experiment be repeated but with the use of only 1% of meta boric acid, pulverized to the same fineness, the product will be fused, dark colored and low in the amount and degree of polymerization.

Example No. 5.—*Boric acid and a mineral acid as co-catalyst*

Alpha anhydrous dextrose crystals preliminarily dried are treated to incorporate 0.005%

(0.0005% to 0.005%) of dry hydrogen chloride gas; and with the dextrose thus treated is blended 5% of meta boric acid pulverized to 170 mesh or finer. The blend is then heated for 5 hours at a temperature of 140° C. (284° F.) and gives a polymer product, the isopropyl alcohol analysis of which is as follows:

Table 5

| Isopropyl alcohol added to 15 cc. polymer solution to give alcohol contents of— | Percent dextrose polymer precipitated on total dry substance in sample | Degree of polymerization indicated by number of dextrose units |
|---|---|---|
| 20 cc | 47 | 9.2 |
| 35 cc | 24 | 6.8 |
| 85 cc | 10 | 5.8 |
| Total | 81 | |

In comparing these figures with those obtained in Example No. 1, where meta boric acid alone is used, it will be seen that the total amount of polymer is increased from 73% to 81% and that the degree of polymerization is increased very considerably as indicated particularly by the fact that with the boric acid alone the amount precipitated with 20 cc. of isopropyl alcohol is 35% while with the boric acid hydrochloric-acid catalyst combination it is 47%. In the process of this example, the amount of mineral acid is very small so that it will not bring about any considerable lowering of the melting point of the dextrose. The mineral acid may, therefore, be appropriately designated a secondary or co-catalyst. The mineral acid by itself will not function to produce polymerization by surface reaction. For this the boric acid powder is necessary.

For the conditions of this example 140° C. (284° F.) is about the maximum temperature usable due to the fact that even this small amount of hydrochloric acid will lower to some extent the melting point of the dextrose so as to make it possible for the material to go over into the molten phase. However, as will be seen from the following example, the mineral acid lowers not only the melting point of the dextrose, but also its minimum polymerizing temperature, so that the heat treatment of the dextrose may be carried on at a lower temperature and still bring about polymerization.

EXAMPLE No. 6.—*Boric acid-mineral acid catalyst mixtures in which the acid lowers polymerizing temperature*

In Example No. 1 in which the catalyst was meta boric acid alone, the minimum reacting temperature was given as about 133° C. (271° F.). Hydrochloric acid, in the small amounts specified in Example No. 5, may be used to lower this minimum from 133° to 120° C. (271° to 248° F.). This lowering of the minimum polymerizing temperature is an advantage where a dextrose polymer of very light color is desired. Another advantage of lowering the minimum polymerization temperature is that the supplementary polymerization treatment (contemplated by Examples Nos 2 and 3) may also be carried on at lower temperatures, for example, at 140° C. (284° F.) instead of 175° C. (347° F.) without sacrifice of amount or degree of polymerization and with enhanced color advantages. The alpha anhydrous dextrose according to this Example 6 is treated with 0.005% hydrochloric acid and blended with 5% of meta boric acid pulverized to 170–200 mesh, as in the preceding examples, and then subjected to heat treatment first at 120° C. and then at 140° C. The following table indicates results according to the isopropyl alcohol test:

Table 6

| Polymerizing treatment | Precipitation at isopropyl alcohol contents | | | Total polymerization |
|---|---|---|---|---|
| | 20 cc. | 35 cc. | 85 cc. | |
| | Per cent | Per cent | Per cent | Per cent |
| 5 hours at 120° C | Trace | 13 | 6 | 19 |
| 15 hours longer at 120° C | Trace | 15 | 6 | 21 |
| 5 hours longer at 140° C | 51 | 22 | 10 | 83 |

Comparing these figures with those of Examples Nos. 2 and 3, it will be seen that the same general type of polymer is obtained with respect to amount and degree of polymerization; but the fact is that by carrying on the polymerizing operations at lower temperatures the formation of color is reduced. A still further polymerization can be obtained by subjecting one of the 120° C. polymers, or the 140° C. polymer, to a treatment at 175° C.

However, the product produced at 120° C. appears to have humectant properties different from and better than the humectant properties of the higher polymers; so that the reduction of the polymerizing minimum temperature may have an advantage other than the color advantage above noted.

Any mineral acid or acid salt or neutral salt may be used in place of the specified hydrochloric acid for lowering the polymerizing temperature, provided the substance has no decomposing effect on the dextrose or its polymers. Examples are phosphoric acid, sulfuric acid, sulfur dioxide, and nitric acid; the latter being usable without detriment to the dextrose because of the prevalence of anhydrous conditions.

EXAMPLE No. 7.—*Meta boric acid and neutral salts as co-catalysts*

With alpha anhydrous dextrose crystals is blended 5%, by weight, of meta boric acid and 1% of finely powdered barium perchlorate. The blend is heated for 5 hours at 140° C (284° F.) and when analyzed by the isopropyl alcohol test shows results as follows:

Table 7

| Precipitation at isopropyl alcohol contents | | | Total polymerization |
|---|---|---|---|
| 20 cc. | 35 cc. | 85 cc. | |
| Per cent | Per cent | Per cent | Per cent |
| 37 | 29 | 12 | 78 |

EXAMPLE No. 8.—*Meta boric acid and neutral salts—Preliminary low temperature treatment*

The process is the same as in Example 7 except that the sugar is given preliminary heat treatment at 120° C. (248° F.). Temperatures, duration of heat treatments and the results of the isopropyl alcohol analysis are given in the following table:

Table 8

| Polymerizing treatment | Precipitation at isopropyl alcohol contents | | | Total polymerization |
| --- | --- | --- | --- | --- |
| | 20 cc. | 35 cc. | 85 cc. | |
| | Per cent | Per cent | Per cent | Per cent |
| 5 hours at 120° C | 0 | 0 | 0 | 0 |
| 15 additional hours at 120° C | 0 | Trace | 1 | 1 |
| 5 additional hours at 140° C | 43 | 26 | 12 | 81 |

The amount and degree of polymerization in this example are greater than the amount and degree of polymerization of Example No. 1, in which boric acid alone is used. In the present Example No. 8, little polymerization results, apparently, from the heating of the sugar at 120° C., at least as measured by the described isopropyl alcohol analysis. Nevertheless, this preliminary heat treatment is significant. It probably involves some rearrangement of the molecular structure of the dextrose or produces an incipient reaction between the dextrose and the catalytic material which facilitates polymerization at the subsequent 140° C. treatment and minimizes color formation. In this and in the previous example, the presence of the neutral salt lowers to some extent the minimum polymerizing temperature of the dextrose.

In place of barium perchlorate as a secondary or cocatalyst one may use the perchlorate of potassium or of sodium or any other neutral water soluble salt which will not decompose dextrose, or its polymers at the polymerizing temperature. Generally speaking, a salt is considered to be a neutral salt if its water solution has a pH between 5 and 7. If the pH is substantially above 7, the alkalinity of the salt will tend to decompose the dextrose.

By heating in the second operation to 175° C., the amount and degree of polymerization may be further increased.

EXAMPLE No. 9.—*Meta boric acid and sulfur dioxide as the secondary catalyst*

Sulfur dioxide can be considered a mineral acid although it is a weak acid in contrast to hydrochloric, sulfuric, or nitric acid. Sulfur dioxide has been found to be a very desirable secondary or co-catalyst when used with boric acid. In carrying out the process of this example, alpha anhydrous dextrose, properly dried, has blended therewith 5% of meta boric acid; the dextrose, and preferably also the boric acid, being preliminarily treated, separately, with a weak flow of sulfur dioxide for 10 or 12 hours at 80° C. (176° F.). The term "weak flow" means about ¼ cc. of sulfur dioxide gas per second per 100 grams of dextrose and with an equivalent amount for the boric acid. In each case the dextrose and the boric acid after treatment will contain hardly more than a trace of the sulfur dioxide. The material is then heated at 140° C. for 5 hours while continuing the application of sulfur dioxide to the material under treatment. The following are the results given by the isopropyl alcohol test of the product of this example.

Table 9

| Precipitation at isopropyl alcohol contents | | | Total polymerization |
| --- | --- | --- | --- |
| 20 cc. | 35 cc. | 85 cc. | |
| Per cent 44 | Per cent 26 | Per cent 11 | Per cent 81 |

The sulfur dioxide may be incorporated with either the dextrose alone or the boric acid alone.

The sulfur dioxide should, of course, be in a dry state.

EFFECT OF IMPURITIES IN COMMERCIAL DEXTROSE

Experiments have indicated that for efficient operation, productive of a large amount and a high degree of polymerization, there must be used with the primary catalyst, boric acid, a secondary or co-catalyst, such as a mineral acid, an acid salt or a neutral salt, the amount of which, however, may be very small, indeed hardly more, in some cases, than a trace. This observation does not invalidate the results set forth in Examples 1, 2 and 3 for the reasons that, first, commercial high purity dextrose always contains a small amount of non-dextrose substance, particularly sodium chloride; and second, these processes were carried out in a starch making plant, the atmosphere in which contained acidic substances, particularly sulphur dioxide; and under these conditions the primary catalytic action would be to some extent, at least, accelerated by these secondary catalysts. Alpha anhydrous dextrose even though very close to 100% pure contains, ordinarily, about 0.05% of sodium chloride; and experiments have shown that if commercial alpha anhydrous dextrose be purified by repeated crystallizing operations so as to reduce its ash (sodium chloride) content to a figure much more closely approaching zero, the amount and degree of polymerization, using meta boric acid as a primary catalyst, will be very substantially reduced. Furthermore, the atmosphere in areas in which industrial and particularly chemical plants such as starch factories are located contains appreciable amounts of acidic gases, such as sulphur oxides, carbon dioxide, nitrogen oxides and hydrochloric acid, as well as other non-alkaline impurities; and if this air, without purification, is employed, as in Examples 1, 2 and 3, for removing moisture from the sugar being polymerized, or in any case if the air is in contact with the sugar under treatment, a small but, in its effect, appreciable amount of secondary catalytic substance will be present during the reaction. If, however, this air is purified, experience has shown that, using alpha anhydrous dextrose containing the usual quantity of sodium chloride, the amount and degree of polymerization (other factors being equal) will be appreciably reduced, as illustrated in Example 10 below. However, even when the dextrose, the boric acid and also the air used to eliminate water are all carefully purified to remove sodium chloride, acidic substances and other catalytic impurities, some polymerization occurs which indicates that boric acid can be used as a sole catalyst.

EXAMPLE No. 10.—*Meta boric acid and sodium chloride as co-catalysts with purified air*

5%, by weight, of meta boric acid is blended with commercial alpha anhydrous dextrose, containing the normal small amount of sodium chloride, and heated for 5 hours at 140° C. (284° F.). To another batch of alpha anhydrous dextrose of the same character is added 5%, by weight, of meta boric acid and 1% of finely powdered sodium chloride and the material is heated also for 5 hours at 140° C. In both of these cases the air used for the pre-drying and polymerization has had substantially all of its impurities eliminated. The results of these operations, in accordance with the isopropyl alcohol test, are given in the following table:

Table 10

| | Precipitation at isopropyl alcohol contents of— | | | Total polymerization |
|---|---|---|---|---|
| | 20 cc. | 35 cc. | 85 cc. | |
| | Per cent | Per cent | Per cent | Per cent |
| With 1% sodium chloride added | 15 | 38 | 17 | 70 |
| With no added sodium chloride | 2 | 17 | 25 | 44 |

Comparing the results of the operating using 1% sodium chloride with the results given under Example No. 1, the lower polymerization figures may be in some degree a consequence of using a temperature of 140° C. instead of 135° C. However, it is evident that the chief reason for reduction in amount and degree of polymerization in both cases is due to the use of air free from secondary catalytic impurities. But these data show that additional sodium chloride considerably increases polymerization.

EXAMPLE No. 11.—*Beta anhydrous dextrose with meta boric acid as catalyst*

It does not appear to be practical to attempt to polymerize the ordinary or commercial beta anhydrous dextrose, in accordance with the procedures given above, because of the tendency of the material to melt and resinify under the polymerizing conditions. This is due to the fact that most commercial beta anhydrous dextrose contains from 30% to 35% of alpha anhydrous dextrose; and apparently this lowers the melting point of the sugar to such an extent that in the polymerizing operation a portion of the sugar is reduced to a molten state. However, it has been discovered by applicant that beta anhydrous crystals, if in a substantially pure state, that is, free from the alpha anhydrous, can be successfully polymerized, according to the present invention. Any suitable method may be employed for removing the alpha anhydrous dextrose from commercial beta. Or, if available one may use a beta dextrose having originally a sufficiently high beta content. In the pure state the beta will have a melting point of 150° C. (302° F.). The procedure will then be as follows:

To the beta anhydrous dextrose crystals are added 5%, by weight, (a trace to 35%) of meta boric acid pulverized to a 170 mesh or finer, and 0.005% of hydrochloric acid (0.0005 to 0.005). The constituents of this mixture are blended, as in the other examples and the blend heated for 5 hours at 140° C. (284° F.) This procedure gives dextrose polymers in amounts, by the isopropyl alcohol analysis as follows:

Table 11

| Precipitation at isopropyl alcohol contents of— | | | Total polymerization |
|---|---|---|---|
| 20 cc. | 35 cc. | 85 cc. | |
| Per cent | Per cent | Per cent | Per cent |
| 5 | 30 | 28 | 63 |

EXAMPLE No. 12.—*Beta anhydrous dextrose with boric acid as catalyst and supplemental heating*

The process is the same as that disclosed in Example No. 11, except that the sugar-catalyst mixture is heated for 20 hours at 120° C. and then 5 hours at 140° C. The product will contain polymerized dextrose in quantities shown by the following table:

Table 12

| Precipitation at isopropyl alcohol contents of— | | | Total polymerization |
|---|---|---|---|
| 20 cc. | 35 cc. | 85 cc. | |
| Per cent | Per cent | Per cent | Per cent |
| 52 | 21 | 10 | 83 |

Both Examples 11 and 12 give polymerized products light in color. The particles are substantially in the form of the dextrose crystals treated. The dextrose crystals do not lose their individuality as to form.

EXAMPLE No. 13.—*Dextrose hydrate with boron anhydride as catalyst*

Equal parts of crystalline dextrose hydrate and boric anhydride are heated at 100° C. (212° F.) for three hours with frequent agitation and removal of hydrate water vapor. The material is then heated at 135° C. (275° F.) for 5 hours. The product is a dextrose polymer light in color and consisting of crystal-like particles closely resembling in form the hydrate dextrose crystals. The character of the product is indicated by the following table based on the isopropyl alcohol analysis, the figures being, however, estimated.

Table 13

| Precipitation at isopropyl alcohol contents of— | | | Total |
|---|---|---|---|
| 20 cc. | 35 cc. | 85 cc. | |
| Per cent | Per cent | Per cent | Per cent |
| 48 | 25 | 10 | 83 |

The effect of the molecular water in the dextrose hydrate, in this example, is counteracted, apparently, by the use of a large quantity of an anhydrous catalyst and by the preliminary heating at low temperature which to some extent at least removes hydrate water.

EXAMPLE No. 14.—*Dextrose hydrate and meta boric acid*

With dextrose hydrate is blended an equal part of meta boric acid and the blend heated at 100° C. for 3 hours with frequent agitation and removal of vapors, and then heated for 5 hours at 135° C. The product is a dextrose polymer consisting of crystal-like particles having the form of the original dextrose hydrate crystals. It is considerably darker than the product of Example 13 indicating the detrimental effect of less efficient water removal.

EXAMPLE No. 15.—*Maltose with metal boric acid and hydrochloric acid as co-catalysts*

Commercial maltose is in the form of fine crystalline maltose hydrate. This sugar is first heated for 24 hours at approximately 100° C. (212° F.) to drive off the hydrate water without melting the sugar. The dehydrated maltose is then cooled to room temperature and there is blended therewith 5% (a trace to 35%) of meta boric acid pulverized to 170 mesh or finer and, preferably, 0.005% hydrochloric acid (0.0005% to 0.005%). The blend is heated for 24 hours at 100° C. (212° F.) which is close to the melting point of maltose under normal conditions. The product is a white, powdered maltose polymer, the amount and degree of polymerization, according to the isopropyl alcohol method of analysis, being shown in the following table:

Table 15

| Precipitation at isopropyl alcohol contents of— | | | Total polymerization |
|---|---|---|---|
| 20 cc. | 35 cc. | 85 cc. | |
| Per cent 4 | Per cent 35 | Per cent 21 | Per cent 60 |

EXAMPLE 16.—*Maltose with boric acid and hydrochloric acid as co-catalysts and with temperature above melting point of maltose*

The operating data are the same as in Example No. 15 with the exception that the sugar is finally heated to a temperature considerably above the melting point of maltose without, however, affecting the crystal-like character of the product. That is, maltose in the form of maltose hydrate crystals is first heated for 24 hours at approximately 100° C. (212° F.) for the primary purpose of driving off the hydrate water. However, this heat treatment even without the presence of a catalyst initiates polymerization as appears from the fact that after the maltose has been cooled, and there is blended therewith 5% of meta boric acid and 0.005% hydrochloric acid, as in the previous example, the blend may be heated to a temperature of 135°–14° C. (275°–284° F.) for 5 hours without any substantial melting of the maltose. The product is a light-colored product of crystal-like character, and the amount and degree of polymerization are much increased over the product of Example No. 15, as indicated by the following table:

Table 16

| Precipitation at isopropyl alcohol contents of— | | | Total polymerization |
|---|---|---|---|
| 20 cc. | 35 cc. | 85 cc. | |
| Per cent 46 | Per cent 25 | Per cent 10 | Per cent 81 |

It will be observed that the procedures for beta anhydrous dextrose and for maltose are fundamentally the same as those for alpha anhydrous dextrose. In each case a product is obtained which has the form of the original crystals treated but which consists of or contains a substantial quantity of the polymerized sugar. This product is, in the preferred processes, light in color being, as in the case of the polymerized alpha anhydrous dextrose, between a light yellow or straw color and white; that is, it is only slightly darker than the sugar treated. There is no, or at least a very small amount of, fused sugar in the product. After the polymerization has been initiated at temperatures below the melting point of the sugar, larger amounts and degrees of polymerization can be obtained by a heating of the initially polymerized sugar at temperatures considerably above the usual melting points of the sugars, without producing any substantial amount of melting. Even in the initial polymerizing operation of the two-stage processes, the temperature may be somewhat higher than the melting point of the sugar if enough of the primary catalyst, boric acid, in a finely enough powdered condition, is used. The amount and degree of polymerization can be increased by the use of a very small amount of a co-catalyst, e. g., an acid, an acid salt or a neutral salt; and in the case of the dextroses, at least a trace of the co-catalyst appears to be essential for practical operation taking yields into consideration. The melting temperature and also the polymerizing temperature of the sugar may be reduced by the use of small quantities of acids, acid salts or neutral salts (the secondary catalysts) and this makes it possible to carry on the processes, both the one-stage and the two-stage processes, at lower temperatures with resultant minimization of color formation.

The products obtained by the present invention differ from products produced by the polymerization of molten sugars in that first the form of the product is crystalline, not in the strict crystallographic sense but in the sense that the particles have the form of the crystals from which the product is obtained. Hence they may be referred to as "crystal-like" particles. These crystals are not dextrose crystals, since to a large extent the dextrose has been transformed to its polymers. The particles are not crystals of dextrose polymers which, if crystalline in character, would have crystal forms, presumably, different from the sugar crystals treated. The particles do have, however, the form, substantially unchanged, of the crystals from which the product is made. And the product, therefore, has all of the advantages, from a practical standpoint, of a crystalline product. The polymerizing operations are essentially anhydrous operations. The aim should be to use, so far as possible, anhydrous materials and to remove as quickly as possible any freed water such as the water which is eliminated from the dextrose as a result of the polymerizing operations.

It will be understood that in the above specific examples the intention has been to set forth the conditions under which the best results are obtainable, to wit maximum amount and degree of polymerization and minimum color formation. However, it will be possible to operate outside of the specified ranges which, generally speaking, are practical and not critical, except where so specified, and effect the polymerization of the sugar although not with the best results qualitatively or quantitatively. The invention, therefore, is not to be considered as limited to operations within the specified ranges. It is intended to cover by patent all equivalents in respect to sugars and catalytic materials used, as well as all process modifications within the scope of the hereto appended claims,

I claim:

1. Process of polymerizing dextrose which comprises: heating, under substantially anhydrous conditions, crystalline dextrose in the form of fairly large crystals at a polymerizing temperature which does not reduce the dextrose to a molten state in contact with a catalytic material comprising a pulverulent compound of the group consisting of boric anhydride and tetra, meta and ortho boric acids.

2. Process of polymerizing dextrose which comprises: heating, under substantially anhydrous conditions, crystalline dextrose in the form of fairly large crystals, in contact with catalytic material comprising pulverulent meta boric acid, at a polymerizing temperature which does not reduce the dextrose to a molten state.

3. Process of polymerizing dextrose which comprises: heating alpha anhydrous dextrose in the form of fairly large crystals at a polymerizing temperature which does not reduce the dextrose to a molten state in contact with a catalytic material comprising a pulverulent, non-alkaline boron compound containing $B_2O_3$.

4. Process of polymerizing dextrose which comprises: heating, under substantially anhydrous conditions, crystalline dextrose in the form of fairly large crystals, in contact with a catalytic material comprising a pulverulent, non-alkaline boron compound containing $B_2O_3$, at a polymerizing temperature which does not reduce the dextrose to a molten state; and, after polymerization has been initiated, heating the material at a higher temperature below the melting point thereof.

5. Process of polymerizing dextrose which comprises: heating, under substantially anhydrous conditions, crystalline dextrose in the form of fairly large crystals, in contact with a catalytic material comprising a pulverulent, non-alkaline boron compound containing $B_2O_3$, at a polymerizing temperature which does not reduce the dextrose to a molten state; and, after polymerization has been initiated, heating the material at a temperature above the normal melting point of the dextrose and below the melting point of said material as to which polymerization has been initiated.

6. Process of polymerizing dextrose which comprises: heating, under substantially anhydrous conditions, dextrose in the form of fairly large crystals at a polymerizing temperature which does not reduce it to a molten state in contact with catalytic material comprising a pulverulent, non-alkaline boron compound containing $B_2O_3$ and a small quantity of a co-catalyst of the group of substances consisting of the acids, acid salts and neutral salts.

7. Process of polymerizing dextrose which comprises: blending with crystalline dextrose in the form of fairly large crystals a pulverulent, non-alkaline boron compound containing $B_2O_3$ and also a small amount of a catalyzing substance of the group of substances consisting of the acids, acid salts and neutral salts; and heating the blended material, under substantially anhydrous conditions, first at a temperature below the melting point of the dextrose and then at a polymerizing temperature above the normal melting point of the dextrose but below the melting point of the material resulting from treatment of the dextrose at a temperature below the melting point of the dextrose.

8. Process of polymerizing dextrose which comprises: heating crystalline dextrose in the form of fairly large crystals under substantially anhydrous conditions and at a polymerizing temperature which does not reduce the dextrose to a molten state in contact with catalytic material comprising a pulverulent, non-alkaline boron compound containing $B_2O_3$.

9. Process of polymerizing dextrose which comprises: blending with dextrose crystals of about 20 to about 100 mesh, a catalytic material comprising a boron compound of the group consisting of boric anhydride and tetra, meta and ortho boric acids, pulverized to a minimum fineness of about 170 mesh; and heating the blend, under substantially anhydrous conditions, at a polymerizing temperature which does not reduce the dextrose to a molten state.

10. Polymerizing process which comprises: heating, under substantially anhydrous conditions, a crystalline sugar having the spacial configuration of d-glucose, and in the form of fairly large crystals at a polymerizing temperature which does not reduce the sugar to a molten state, and mixed with a polymerizing catalyst comprising a non-alkaline boron compound containing $B_2O_3$ in a finely divided form in contact with the surfaces of the sugar crystals, whereby polymerization takes place without substantial change in the form of the sugar crystals.

11. Process of polymerizing dextrose which comprises: blending with crystalline anhydrous dextrose in the form of fairly large crystals meta boric acid in a pulverulent state and a small amount of a secondary catalyst which reduces the polymerizing temperature of the dextrose and which is selected from the group of substances consisting of the acids, acid salts and neutral salts; heating the blend at a polymerizing temperature below the melting point of the dextrose to bring about polymerization of the dextrose without reducing the material to a molten state; and thereafter heating the material at a substantially increased temperature below the melting point of said material.

12. Polymerization process which comprises: blending with relatively large crystals of sugar composed of dextrose units, a catalytic material comprising a pulverulent, non-alkaline boron compound containing $B_2O_3$; and heating the blend, under substantially anhydrous conditions, at a polymerizing temperature which does not reduce the material treated to a molten state.

13. Process of polymerizing dextrose which comprises: blending a minimum of about five per cent, by weight, of meta boric acid pulverized to a minimum fineness of about 170 mesh, with crystalline alpha anhydrous dextrose in the form of fairly large crystals; and heating the blend at a temperature between 133° and 145° C. (271°–293° F.).

14. Process of polymerizing dextrose which comprises: blending with fairly large alpha anhydrous dextrose crystals pulverulent meta boric acid and a small amount of dry hydrogen chloride gas; and heating the blend at a polymerizing temperature which does not reduce the dextrose to a molten state.

15. Process of polymerizing dextrose which comprises: heating, under substantially anhydrous conditions, fairly large dextrose crystals at a polymerizing temperature which does not reduce the dextrose to a molten state in contact with a pulverulent, non-alkaline boron compound containing $B_2O_3$ and sulfur dioxide as a co-catalyst.

16. Process of polymerizing dextrose which comprises: blending with fairly large dextrose crystals a pulverulent, non-alkaline boron compound containing $B_2O_3$ and a substance selected from the group consisting of the perchlorates of barium, sodium and potassium; and heating the blend, under substantially anhydrous conditions, at a polymerizing temperature which does not reduce the dextrose to a molten state.

17. Process of polymerizing dextrose which comprises: heating, under substantially anhydrous conditions, crystalline dextrose in the form of fairly large crystals at a polymerizing temperature which does not reduce the dextrose to a molten state in contact with a catalytic material comprising a pulverulent, non-alkaline boron compound containing $B_2O_3$ and also a small amount of a substance selected from the group consisting of the chlorides of sodium and hydrogen.

18. Process of polymerizing dextrose which comprises: heating crystalline beta anhydrous dextrose in the form of fairly large crystals at a polymerizing temperature which does not reduce the dextrose to a molten state in contact with a catalytic material comprising a pulverulent, non-alkaline boron compound containing $B_2O_3$.

19. Process of polymerizing a sugar compound consisting of at least one dextrose unit which comprises: mixing with the sugar in the form of fairly large crystals catalytic material comprising a pulverulent, non-alkaline boron compound containing $B_2O_3$ and a small amount of a cocatalyst of the group consisting of the acids, acid salts, and neutral salts; and heating the sugar, under substantially anhydrous conditions, at a polymerizing temperature which does not reduce the dextrose to a molten state.

20. In the polymerization of sugar composed of dextrose units in which a non-alkaline boron compound containing $B_2O_3$ is used as a catalyst, the process of removing the boron compound from the polymerized product which comprises: suspending the polymerized product and boron compound mixture in methanol; removing the methanol and methyl borate from the polymer by distillation and decanting; treating the methanol and methyl borate with an alkali; distilling off the methanol; treating the alkali borate with an acid; and concentrating the resultant solution and removing therefrom the ortho boric acid.

21. Polymerization process for sugars composed of at least one dextrose unit which comprises: blending with the sugar in an anhydrous state and in the form of fairly large crystals, pulverulent meta boric acid; heating the blend to polymerize the sugar without reducing it to a molten state; suspending the product in anhydrous methanol; removing the methanol and the methyl borate from the sugar polymers by distillation and decanting; treating the methanol and methyl borate with an alkali; distilling off the methanol and re-using it in the process; treating the alkali borate with an acid; concentrating the solution and crystallizing and removing therefrom ortho boric acid; heating the ortho boric acid to remove molecular water and transform the same to meta boric acid; and re-using the recovered meta boric acid in the process.

22. Process of polymerizing dextrose which comprises: heating crystalline alpha anhydrous dextrose in the form of fairly large crystals at a polymerizing temperature which does not reduce the dextrose to a molten state in contact with a catalytic material comprising a pulverulent compound of the group consisting of boric anhydride and tetra, meta and ortho boric acids.

23. Process of polymerizing dextrose which comprises: heating, under substantially anhydrous conditions, crystalline dextrose in the form of fairly large crystals, in contact with a catalytic material comprising a pulverulent compound of the group consisting of boric anhydride and tetra, meta and ortho boric acids, at a polymerizing temperature which does not reduce the dextrose to a molten state; and, after polymerization has been initiated, heating the material at higher temperature below the melting point thereof.

24. Process of polymerizing dextrose which comprises: heating, under substantially anhydrous conditions, dextrose in the form of fairly large crystals at a polymerizing temperature which does not reduce the dextrose to a molten state in contact with catalytic material comprising a pulverulent compound of the group consisting of boric anhydride and tetra, meta and ortho boric acids, and a small quantity of a cocatalyst of the group of substances consisting of the acids, acid salts and neutral salts.

25. Process of polymerizing dextrose which comprises: blending with crystalline dextrose in the form of fairly large crystals meta boric ac'd in a pulverulent state and a small amount of a secondary catalyst which reduces the polymerizing temperature of the dextrose and which is selected from the group of substances consisting of the acids, acid salts and neutral salts; heating the blend under substantially anhydrous conditions at a polymerizing temperature below the melting point of the dextrose to bring about polymerization of the dextrose without reducing the material to a molten state; and thereafter heating the material at a substantially increased temperature below the melting point of said material.

26. Process of polymerizing dextrose which comprises: blending a minimum of about five percent, by weight, of meta boric acid pulverized to a fineness of about 170 mesh, with crystalline dextrose in the form of fairly large crystals; and heating the blend under substantially anhydrous conditions at a temperature between 133° and 145° C. (271°–293° F.).

27. Polymerization process for sugars composed of at least one dextrose unit which comprises: blending with the sugar in the form of fairly large crystals a catalytic material comprising a pulverulent compound of the group consisting of boric anhydride and tetra, meta and ortho boric acids; heating the blend under substantially anhydrous conditions to polymerize the sugar without reducing it to a molten state; suspending the product in anhydrous methanol; removing the methanol and the methyl borate from the sugar polymers by distillation and decanting; treating the methanol and methyl borate with an alkali; recovering the methanol and re-using it in the process; treating the alkali borate with an acid; and concentrating the solution and crystallizing and removing therefrom ortho boric acid.

GERALD J. LEUCK.